United States Patent [19]
Howells et al.

[11] 3,858,902
[45] Jan. 7, 1975

[54] VARIABLE-LOAD SUSPENSION FOR LIGHT VEHICLES

[75] Inventors: Paul W. Howells, Morrisville; Robert N. Lothes, Manlius, both of N.Y.

[73] Assignee: Syracuse University Research Corporation, Syracuse, N.Y.

[22] Filed: Apr. 23, 1973

[21] Appl. No.: 353,733

[52] U.S. Cl. .......................... 280/124 R, 267/15 A
[51] Int. Cl. ............................................ B60g 11/56
[58] Field of Search .................. 280/124 R, 124 A; 267/15 A, 15 R

[56] References Cited
UNITED STATES PATENTS
3,278,197  10/1966  Gerin ........................... 280/124 R
3,672,698   6/1972  Froumajou ..................... 267/15 A

*Primary Examiner*—Philip Goodman
*Attorney, Agent, or Firm*—Bruns & Jenney

[57] ABSTRACT

Load-supporting wheels are rotatably supported by independent axle means for each wheel carried on a substantially horizontal arm pivotally secured to the vehicle body. A spring and shock absorber are mounted to act along the same line or along parallel lines of action on a telescoping unit having one end pivotally connected to the horizontal arm and the other end adjustably connected to the body. Motor driven means have one end secured to the body and have another end connected to the unit and are adapted for inclining the unit more or less. A sensor on the horizontal arm is connected to the motor to drive it in one direction or the other according to the inclination of the horizontal arm as the vehicle load is increased or lightened. When the arm has been restored to its normal horizontal position, normal clearance between body and road is restored, and the suspension parameters are matched to the existing load.

3 Claims, 5 Drawing Figures

VARIABLE-LOAD SUSPENSION FOR LIGHT VEHICLES

BACKGROUND OF THE INVENTION

This invention relates to a suspension system for very lightweight vehicles for adjusting the load-bearing characteristics of the springs and the energy dissipating characteristics of the damping means at load-carrying wheels by varying the angle at which the spring and damping means are disposed and, at the same time, automatically maintaining the clearance between the vehicle body and the road at a substantially constant distance.

This adjustable system is applicable to very lightweight vehicles, the vehicle weighing as little as 200 lbs. Two heavy occupants of such a vehicle may change the weight to be supported by the suspension 200 percent whereas, in a 3,500 lb. vehicle, a 150 lb. driver adds only about 4 percent to the gross weight.

Prior art devices include means for adjusting the height of the vehicle frame above the ground, particularly for agricultural vehicles, the vehicle having a cogwheel and circular-rack drive and screw and nut means for raising and lowering the frame. Similar means on each side of the vehicle may be used to level the frame while the vehicle travels along a hillside. Coil springs are commonly used in vehicle suspensions but their line of action, usually substantially vertical, remain substantially the same regardless of vehicle load in such prior art suspension systems.

Tilt compensating means are also known for four wheeled vehicles for maintaining the vehicle body level while rounding turns or for running on slanted surfaces but such devices heretofore known have employed complicated and expensive combinations of springs and hydraulic cylinders to control the load-supporting characteristics of the spring means.

The conventional suspension, because it is not adjustable, must be designed with a spring that is stiff enough to support the maximum load that is to be carried, maintaining adequate road clearance, adequate wheel-well clearance and maintaining a near-normal vehicle attitude under conditions of drastically unbalanced cargo loading. If this design technique is applied to vehicles of widely varying gross weight the stiff springs produce a very harsh ride when the vehicle is lightly loaded.

SUMMARY OF THE INVENTION

The present invention contemplates mounting a spring, such as a coil spring, and a damping means, such as a hydraulic shock absorber, in parallel or coaxially, on a telescoping unit which can be inclined more or less in accordance with changes in the load. Such a unit is included in the body to wheel connection for the load-carrying wheels or to selected wheels, such as the two rear wheels of three or four wheel vehicles where most of the weight is carried by the rear wheels. The purpose of changing the angle of the line of action of spring and damper in response to change in weight of the load, of course, is to obtain the soft-ride characteristics of a "soft" spring when the vehicle is lightly loaded without simply using a stiff spring strong enough to support the maximum expected load regardless of the actual load as is done in heavier vehicles.

In order to obtain constant clearance between road and body, the wheel is rotatably mounted on one end of an arm whose other end is pivotally or oscillatably secured to the vehicle frame or body for vertical movement of the wheel, the arm being substantially horizontal when the frame is at a selected height above the road surface.

One end of the telescoping unit is pivotally secured to the horizontal arm and its other end is adjustably connected to the vehicle frame to support it. Means for adjusting the angle at which the telescoping unit is disposed are provided and may include a reversible electric motor connected to the vehicle frame and adapted to drive a screw engageable with a nut connected to the adjustable telescoping unit. Since a change in angle is involved, both these connections are pivotal.

For controlling the angular disposition of the telescoping unit in response to the load of the vehicle, a sensing device, typically a mercury switch is mounted on the horizontal arm. The switch is in off position when the arm is horizontal but connects the reversible motor to a source of power to energize the motor to rotate in one direction when the load is increased and connects the motor to rotate in the other direction when the load is lightened. An orientation of the spring perpendicular to the arm results in a stiff suspension, appropriate to a heavy load, while a disposition of the spring well off the perpendicular results in a soft suspension appropriate to a light load. Each value of load uniquely determines a proper angular orientation of the telescoping unit. As will be shown, this orientation causes the natural frequency and the damping ratio of the suspension to remain constant regardless of the value of load. This angular adjustment of the telescoping unit to match load is a first condition to be satisfied. A second condition is that the deflection of the suspension spring (its change in length), as it is stressed in assuming the prevailing load, must not cause the vehicle body to shift from its normal rest position with the trailing arm horizontal. Because the body must not shift, the change in length of the spring must be accommodated by allowing the point of attachment of the telescoping arm to the body to shift inwardly or outwardly from the point at which the unit attaches to the trailing arm by an amount equal to the length change in the spring. Thus, each value of load uniquely determines two conditions: the angular orientation of the telescoping unit and its length. A unique feature of this invention is the design technique whereby the two conditions (angular orientation and length) on the telescoping unit are satisfied by a single automatic adjustment.

In one embodiment a compression spring is used and the upper end of the telescoping unit is provided with a roller which is engaged and guided by a curved track or groove in the vehicle frame. This, in effect, alters the point at which the load-supporting spring is attached to the body. Alternatively, by making the track arcuate about a center lower than and spaced toward the vehicle center from the point of attachment of the telescoping unit to the horizontal arm, the same provision for the change in length of the telescoping unit caused by increasing the load is closely approximated.

In another embodiment, the upper end of the telescoping unit is rotatably or pivotally secured to one end of a connecting rod whose other end is pivotally secured to the body at a point approximating the center of the curve of the track of the first embodiment. This guides the upper end of the telescoping unit along the same curve as the curve-approximating arcuate curve of the above-mentioned first embodiment.

In still another embodiment a tension spring is used and the upper end of the telescoping member is pivotally secured to the top of an extension from the horizontal arm projecting upward from its pivotal connection to the body. The other and lower end of the telescoping unit is pivotally secured to the lower end of a connecting rod whose upper end is pivotally secured to the body. In this latter embodiment, the maximum load-bearing force exerted by the spring is usually obtained as it approaches the horizontal and the horizontal arm is biased downward by the spring.

DESCRIPTION OF THE PREFERRED EMBODIMENTS

Figure 1:
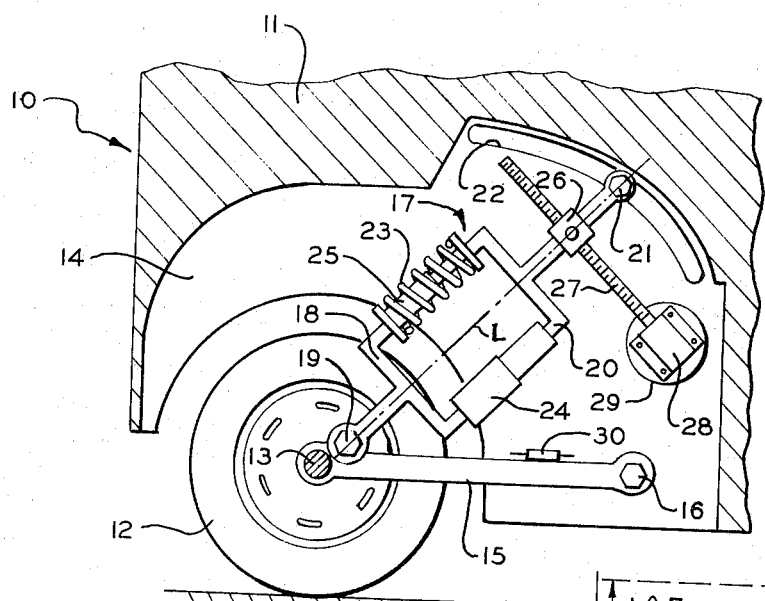
FIG. 1 is a fragmentary, diagrammatic sectional view of a wheel and its suspension according to the invention as viewed from a longitudinally extending vertical plane within the vehicle spaced from the side thereof.

Referring to FIG. 1, a very compact and light vehicle 10 has a body or frame 11, diagrammatically and fragmentarily shown. The rear wheel and tire 12 is mounted on axle 13 and the usual wheel well 14 in the body 11 is extended forward to contain the automatically adjustable suspension system to be described.

Axle 13 is supported on a normally substantially horizontal arm 15 whose forward end is pivotally secured at 16 to the body 11 so that the wheel 12 may move up and down with respect to the body. The weight of the body and its load is resiliently borne by an angularly adjustable assembly herein referred to as the telescoping unit 17.

It will be understood that the arm 15 may be bifurcated and extend to bearing members for the shaft 13 on either side of wheel 12. Each wheel 12 is thus independently supported.

Unit 17 comprises a lower section 18 whose lower end is pivotally secured to arm 15 at 19 near the axle, and an upper section 20 whose upper end bears a roller 21 engaged in a curved track or groove 22 in body 11. Mounted on one telescoping arm of unit 17 is a compression coil spring 23 and mounted on the other arm is a damper or shock absorber 24 so that the spring exerts its bias in one direction and the damper its dampening friction in the same or opposite direction. Damper 24 is itself telescopic and the arms of bifurcated portions 18 and 20 around which the spring is secured have a telescopic connection at 25.

The upper end portion 20 of member 17 carries a nut 26 pivotally secured thereto spaced from roller 21 and threadedly engaging a screw 27. The screw is rotatable by means of an electric motor 28 which is reversible. Screw 27 is secured to the shaft of motor 28 by a universal coupling or, as shown, the motor is mounted on a turntable 29.

Other means operated by a motor may be used for varying the angle at which unit 17 is disposed. For example, a cable attached to portion 20 at both ends may be arranged on a plurality of pulleys and powered by a suitable motor-powered capstan for inclining the unit in one direction or the other in response to signals from the switch 30. Alternatively, the inclination may be powered by a two way hydraulic cylinder and piston with one end connected to body 11 and the other end connected to portion 20 of the unit.

A sensing device, preferably a mercury switch 30, is mounted on arm 15 to control motor 28 so as to keep arm 15 horizontal so that body 11 is kept at a selected distance above the roadway at all times. By electrical connections, not shown, between switch 30 and motor 28, the motor runs in one direction to move member 17 toward the vertical when weight is added to the vehicle's load and to incline the member in the other direction when body 11 moves upward in response to a lightened load. The switch 30 is in "off" position when arm 15 is horizontal.

Arm 15 is herein referred to as the "horizontal arm" for the purpose of brevity but it will be hereinafter apparent that the arm itself may extend at an angle from the horizontal as much as 15 or 20° so long as the switch 30 is mounted on the arm horizontally when the arm is in the desired normal position. Switch 30 is not shown in detail since such switches are well known. The switch is made so as to be responsive to error averaged over a short period, typically about 1 second, so that when wheel 12 bounces up and down rapidly in response to road roughness the switch will not chatter back and forth from positive to negative error signals. Furthermore the switch is given a small but definite dead-band of no signal output centered on the zero-error disposition.

Figure 2:
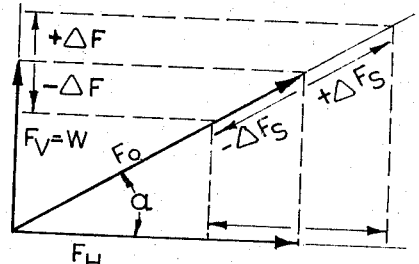
FIG. 2 is a vector diagram of the spring and damper forces of the device of FIG. 1.

The vector diagram of FIG. 2 shows the forces involved in the action of the suspension of FIG. 1. The telescoping unit 17 lies at angle $a$ from the horizontal. In FIG. 2, force vectors along that line represent the forces exerted by the telescoping unit against the vehicle's body. The wheel under discussion supports a weight W which is its share of the total vehicle weight. The vector $F_o$ is the static force exerted by the spring in supporting load W, so its vertical component $F_v$ must be equal to W. The horizontal component of $F_o$ is in equilibrium with the tension in the horizontal arm 15. With the vehicle in motion, road perturbations create a dynamic situation in which the tip of the suspension force vector sweeps back and forth along the diagonal line of action at angle $a$. The excursions of the force vector about its quiescent point are depicted as $\pm \Delta F_s$. Their vertical components are identified as $\pm \Delta F$. The horizontal components are balanced by counteracting fluctuations in the tension forces in horizontal arm 15. Vertical motion of the body is governed by Newton's second law:

$$a(\text{acceleration}) = F (\text{force})/M (\text{mass})$$

In the above relation $F$, the sum total of the vertical forces acting on suspended mass $M$, is comprised of the upward component $F_v$, the downward gravitational pull W and the dynamic excursions $\pm \Delta F$:

$$F = F_v - W \pm \Delta F = \pm \Delta F$$

because, by definition, $F_v$ balances W. Thus, body accelerations are directly proportional to the vertical forces transmitted by the suspension, and inversely proportional to that portion of body mass carried by the wheel under consideration. In the ordinary suspension, a given road perturbation produces a definite deflection of the suspension, and thereby produces a force of a definite magnitude regardless of vehicle mass. Hence, a lightly loaded vehicle tends to experience greater accelerations and therefore to bounce more violently than does the same vehicle when heavily loaded.

The adjustable suspension of FIG. 1 provides a means for making suspension forces proportional to body mass, thereby making acceleration independent of body mass. When this is accomplished a lightly loaded vehicle rides as well as a heavily loaded one.

The suspension force fluctuations, $\pm \Delta F_s$ of FIG. 2 are comprised of two contributions, one from the spring, and the other from the damper. The spring of FIG. 1 is in compression, so a deflection of the suspension which further compresses the spring causes a positive spring force contribution, while a stretching beyond its static rest-length causes a negative contribution. Over its normal operating range, however, the total spring force remains positive (compressive). The damper force contribution is proportional to the velocity of its piston within its cylinder, and the direction of the damping force is in the direction that tends to oppose the change in length of the telescoping unit. The vertical force components $\pm \Delta F$ which cause the body accelerations are thus seen to arise from the force fluctuations in the spring and in the damper. To achieve the desired end of making these vertical force components proportional to body mass it is necessary to make both the effective spring rate and the effective damping constant for vertical motions proportional to body mass.

Actual spring rate $K$ is the increment of spring force per unit change in length, both being measured along the axis of the spring or along the line of action $L$ of unit 17 in FIG. 1. Effective (vertical) spring rate is the increment of vertical spring force per unit of vertical motion of the wheel. With attachment pivot 19 located very close to axle 13, the wheel's vertical motion is essentially the motion of pivot 19. The vertical force increment is equal to the actual spring force increment multiplied by $\sin a$. The actual spring length increment is equal to the vertical displacement of pivot 19 multiplied by $\sin a$. Because $\sin a$ enters in both the length ratio and the force ratio, the effective (vertical) spring rate is equal to $K \sin^2 a$. By identical reasoning one finds that the effective (vertical) damping constant is equal to the actual damping constant multiplier by $\sin^2 a$. To achieve the desired end of making the effective spring rate proportional to body weight $W$ then requires that $$K \sin^2 a = C \cdot W \tag{1}$$

where $C$ is a constant. It is furthermore essential that, while angle $a$ is adjusted to meet the above requirement, the load (body) be supported at a constant height above the axle. The burden $W$ causes the spring to compress below its free (unloaded) length by an amount $\Delta L$ such that $$K \cdot \Delta L \cdot \sin a = W \tag{2}$$

This equation together with the preceding equation requires that $$\Delta L = \sin a / C \tag{3}$$

This last relation may be viewed as describing possible loci for the point 21 as the load is varied. Three parameters must be fixed to determine a specific locus; the maximum angle $a_{max}$ for supporting maximum load $W_{max}$, the actual spring rate $K$, and the free (unloaded) length, $L_o$, of the telescoping unit. The choice of $a_{max}$ determines the angular excursion required to accommodate the load range from $W_{min}$ to $W_{max}$:

$$\sin a_{max}/\sin a_{min} = \sqrt{W_{max}/W_{min}} \tag{4}$$

The choice consequently has an appreciable effect on the length excursion that must be permitted in the telescoping unit. The choice of $K$ together with the choice of $a_{max}$ determines the suspension's resonant frequency $f_o$ and the softness of the ride:

$$f_o = (\sqrt{g} \sin a_{max}/2\pi) \sqrt{K/W_{max}} \tag{5}$$

where $g$ is the acceleration of gravity. The choice of $L_o$ is limited only insofar as the telescoping unit must be long enough so that its angular orientation does not change drastically as the wheel executes its normal range of excursions, yet small enough to fit the available space. Once the choices of $a_{max}$, $K$ and $L_o$ are made, point 21 has a definite location on the locus for a given $W$, the body rests at a definite height above the axle, and arm 15 is signalled as substantially horizontal. For any other load, with angle $a$ properly set, the telescoping unit exhibits just the necessary deflection $\Delta L$ to restore body elevation with arm 15 again at the "horizontal." Thus, a simple way to determine the correct angle $a$ to match any load is to adjust $a$ until arm 15 is restored to the horizontal. When this is accomplished, equations (1), (2) and (3) are satisfied, so the effective spring rate, $K \sin a$ has been made proportional to $W$. Identical reasoning will show that this choice of $a$ has simultaneously made the effective damping constant proportional to $W$, as was required.

Evidently, the attainment of the proper value of $a$ to match a given $W$ is a task that can be simply carried out by a reversible motor-driven actuator that is switched on to restore arm 15 to the horizontal.

The general shape of the locus of point 21 can be deduced by observing that it would be a circle of radius $L_o$ centered on point 19 if $\Delta L$ were zero. Clearly, $\Delta L$ could be zero only if an extremely stiff spring (large $K$) were used. For finite $K$ the locus diverges from the $L_o$ circle by amount $\Delta L$, measured radially. In accord with equation (3) the divergence is greatest for large values of $a$ (approaching 90°), and these large angles, according to (1), correspond to the large loads.

Although the locus of point 21 is not precisely circular, it is a curve that is readily computed for the purpose of shaping the track 22. It is furthermore found that the locus is very accurately approximated by a circle of radius differing somewhat from $L_o$ and with a center located below and forward of the lower pivot of the telescoping unit. This circular approximation to the locus permits a remarkably simple and convenient way of constraining the upper end of the telescoping unit to the locus. The constraint is implemented as a rigid arm of length equal to the approximately radius, with its lower end pivoted at the center of the approximating circle and its upper end pivotally attached to the upper end of the telescoping unit. A physical embodiment of this technique is shown in FIG. 3.

Figure 3:
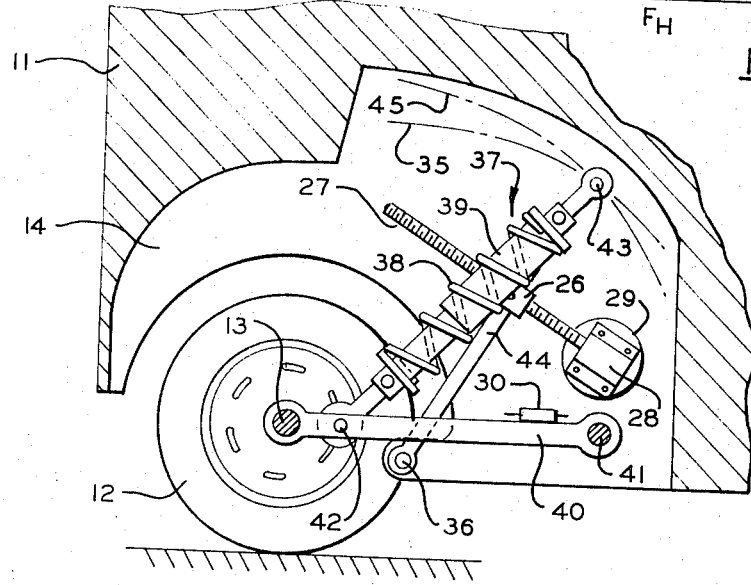
FIG. 3 is a view similar to FIG. 1 of another embodiment.

The suspension shown in FIG. 3 shows the vehicle 11 with wheel 12 mounted on axle 13 and with wheel well 14 extended froward to accommodate the suspension all as shown in FIG. 1. The telescoping unit 37, however, comprises a spring 38 and a damper or shock absorber 39 mounted coaxially, as shown.

The axle 13 is mounted on one end of a horizontally disposed arm 40 whose other end is pivotally secured to the vehicle body at 41. The lower end of unit 37 is pivotally secured to arm 40 at 42, adjacent but spaced from axle 13. The upper end of unit 37 is pivotally secured at 43 to the upper end of a connecting rod 44, the lower end of the rod 44 being pivotally secured at 36 to the body to guide the connection between unit 37 and rod 44 along the arc 35. An arc 45, whose center is at 42, is shown to demonstrate the inclination of the arc 35.

A sensing device 30 is secured to the horizontal arm 40 connected to operate the reversible motor 28 mounted on turntable 29 to turn screw 27 as described in connection with FIG. 1. The nut 26 which cooperates with the screw is pivotally secured to rod 44 as a convenience in construction but the suspension operates like that described in connection with FIG. 1.

The coaxial mounting of spring 38 and damper 39 is a more conveniently constructed unit than that shown in FIG. 1 but operates in the same manner except that the effective point of connection 43 between body and telescoping unit 37 is constrained by rod 44 to follow a precise circular arc which is an excellent approximation to the curved track 22.

It will be noted that the center 36 of arc 35 lies below and to the right of axle 13 in FIG. 3. It has been found, however, that the approximating arcs for suspensions designed for low resonant frequency (soft ride) must have their centers rather lower than is indicated by point 36 of FIG. 3. This would tend to create a problem of insufficient road clearance when designing a suspension for low-weight, low-speed, commuter type vehicles in which soft-ride characteristics are desirable.

Figure 4:
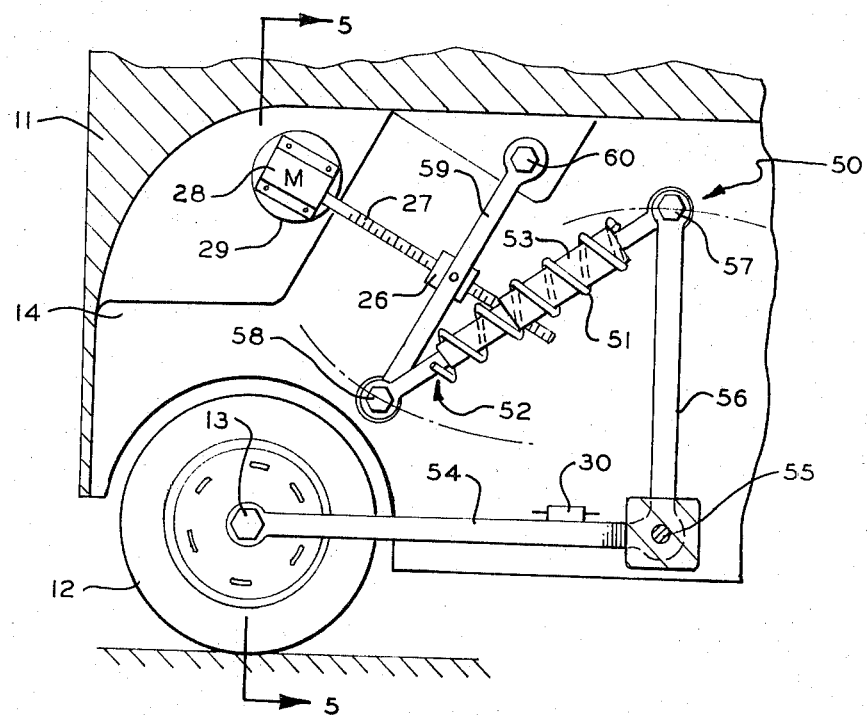
FIG. 4 is a view similar to FIG. 1 of still another embodiment and as viewed from the line 4—4 of FIG. 5.
Figure 5:
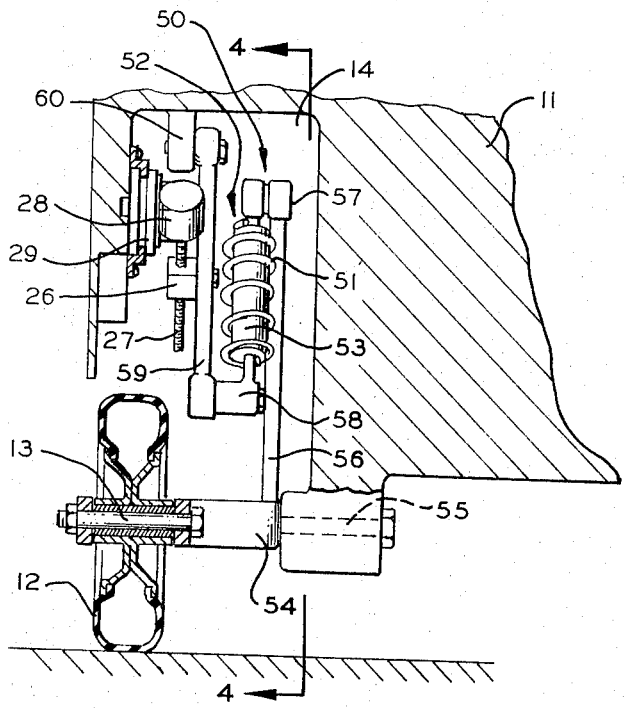
FIG. 5 is a fragmentary sectional view on the line 5—5 of FIG. 4.

Referring to the modified form of suspension 50 of FIGS. 4 and 5, this problem is solved by utilizing a tension spring 51. The telescoping unit 52 comprises the spring 51 and damper or shock absorber 53 mounted coaxially, as shown. The vehicle 11 has a wheel 12 mounted on an axle 13 and the suspension is accommodated in an extended wheel well 14, as shown. Axle 13 is mounted on one end of a horizontally extending forked arm 54 whose forward end is pivotally secured at 55 to the body. Arm 54, however, has an extension 56 extending upward from its connection at 55 and one end of the unit 52 is pivotally secured at 57 to the upper end of extension 56. The other, lower, end of unit 52 is pivotally connected at 58 to the lower end of a connecting rod 59. The other end of rod 59 is connected at 60 to a portion of the body rearward of the connection 57.

Thus rod 59 constrains the end 58 of the telescoping unit to a circular arc which, as before, is an excellent approximating locus.

Reversible motor 28 is mounted on a turntable 29, shown in FIG. 5, secured to a portion of body 11 to the left of rod 59 as seen in FIG. 4. The screw 27 engages the nut 26 which is pivotally secured to the rod 59. The sensor 30, wired to the motor as described in connection with FIG. 1, is secured to a normally horizontal portion of arm 54.

It will be apparent that extension 56 extends vertically for providing a compact structure but extension 56 could extend forwardly, to the right in FIG. 4 and the operation would be the same if securements at 29 and 60 were also similarly rotated forwardly. It will also be apparent that the bias of spring 51 on arm 54 is counterclockwise as seen in FIG. 4 and the operation of the suspension will otherwise be the same as that described for FIGS. 1 and 3. For maximum loads the unit 52 will be oriented substantially normal to the portion of the arm 54–56 to which it is attached.

In FIGS. 4 and 5, unit 52 assumes its maximum load capacity when its line of action approaches the horizontal. In the case where extension 56 is a prolongation of arm 54, unit 52 assumes its maximum load capacity when its line of action approaches the vertical.

We claim:

1. A suspension system for wheeled vehicles having a body subject to wide variations in vehicle load, comprising: selected wheels each being rotatably supported by independent axle means, each axle means being carried on one end of an arm having a substantially horizontal normal disposition, the other end of each arm being pivotally secured to the body for vertical movement of the wheel with respect to the body, a telescopic unit for each wheel having a spring and damper connected between opposite ends of the unit to act in lines of action along substantially the same line, one end of the unit being pivotally connected to the arm adjacent its axle-connected end and the other end of the unit bearing a roller, a curved track secured to the body for guiding the roller therealong means on the arm for sensing its inclination from its normal disposition, and motor driven means controllingly connected to the unit and responsive to the sensing means for inclining the unit in one direction to restore the arm to its normal disposition when the arm is inclined in one direction by a load change and for inclining the unit in the other direction to restore the arm to its normal disposition when the arm is inclined in the opposite direction by a load change, whereby the effective spring and damper constants of the unit are increased and decreased according to the inclination of the arm from its normal disposition in one direction and the other in response to changes in the load and the track being so shaped that each point on the track which causes the effective spring and damper constants to be proportional to the load simultaneously creates just sufficient spring force to support the body with a normal clearance above the road by compensating for changes in the unit length caused by changes in the load.

2. A suspension system for wheeled vehicles having a body subject to wide variations in vehicle load, comprising: selected wheels each being rotatably supported by independnet axle means, each axle means being carried on one end of an arm having a substantially horizontal normal disposition, the other end of each arm being pivotally secured to the body for vertical movement of the wheel with respect to the body, a telescopic unit for each wheel having a spring and a damper connected between opposite ends of the unit to act in lines of action along substantially the same line, the telescoping unit spring being a compression spring, one end of the unit being pivotally connected to the arm adjacent its axle connected end and the other end of the unit being pivotally connected to a connecting rod, the other end of the rod being pivotally connected to the body at a center spaced from and lower than the connection between the unit and the arm, means on the arm for sensing its inclination from its normal disposition, and motor driven means controllingly connected to the unit and responsive to the sensing means for inclining the unit in one direction to restore the arm to its normal disposition when the arm is inclined in one direction by a load change and for inclining the unit in the other direction to restore the arm to its normal disposition when the arm is inclined in the opposite direction by a load change, whereby the effective spring and damper constants of the unit are increased and decreased according to the inclination of the arm from its normal disposition in one direction and the other in response to changes in the load, and the pivot center of the lower end of the rod and the rod length being carefully chosen for guiding the upper ends of the unit and the rod along a path for compensating for changes in unit length caused by changes in the load, whereby the clearance between the body and the road is substantially constant under varied loads.

3. A suspension system for wheeled vehicles having a body subject to wide variations in vehicle load, comprising: selected wheels each being rotatably supported by independent axle means, each axle means being carried on one end of an arm having a substantially horizontal normal disposition, the other end of each arm being pivotally secured to the body for vertical movement of the wheel with respect to the body, a telescopic unit for each wheel having a spring and a damper connected between opposite ends of the unit to act in lines of action along substantially the same line, the telescoping unit spring being a tension spring, the arm having an extension therefrom projecting away from the pivotal connection of the arm to the body, one end of the unit being pivotally connected to the outer end of the arm extension and the other end of the unit being pivotally connected to one end of a connecting rod the other end of the rod being pivotally secured to the body at a center spaced from the arm extension, means on the arm for sensing its inclination from its normal disposition, and motor driven means controllingly connected to the unit and responsive to the sensing means for inclining the unit in one direction to restore the arm to its normal disposition when the arm is inclined in one direction by a load change and for inclining the unit in the other direction to restore the arm to its normal disposition when the arm is inclined in the opposite direction by a load change, whereby the effective spring and damper constants of the unit are increased and decreased according to the inclination of the arm from its normal disposition in one direction and the other in response to changes in the load; and the pivot center of the rod and the respective lengths of the rod and the arm extension all being carefully chosen for guiding the pivotally connected ends of the rod and the unit along a path for compensating for changes in unit length caused by changes in the load, whereby the clearance between the body and the road is substantially constant under varied loads.

* * * * *